(12) United States Patent
Steinke et al.

(10) Patent No.: US 7,405,662 B2
(45) Date of Patent: Jul. 29, 2008

(54) WIRELESS TAG RANGING (75) Inventors: Kurt E. Steinke, Seattle, WA (US);
James D. Wagner, Tangent, OR (US)

(73) Assignee: Datalogic Mobile, Inc., Eugene, OR (US)

( * ) Notice: Subject to any disclaimer, the term of this patent is extended or adjusted under 35 U.S.C. 154(b) by 227 days.

(21) Appl. No.: 11/453,266

(22) Filed: Jun. 14, 2006

(65) Prior Publication Data

US 2007/0001814 A1    Jan. 4, 2007

Related U.S. Application Data

(60) Provisional application No. 60/853,319, filed on Jun. 16, 2005, provisional application No. 60/775,969, filed on Jun. 14, 2005.

(51) Int. Cl.
*G08B 13/14*    (2006.01)

(52) U.S. Cl. .................. 340/572.4; 340/572.1; 342/118

(58) Field of Classification Search .............. 340/572.4, 340/572.1, 572.2, 572.7, 10.1, 825.49; 342/118, 342/125, 127, 129
See application file for complete search history.

(56) References Cited

U.S. PATENT DOCUMENTS

| | | | |
|---|---|---|---|
| 5,665,956 A | 9/1997 | La et al. | 235/472 |
| 6,046,683 A | 4/2000 | Pidwerbetsky et al. | 340/825.54 |
| 6,118,988 A | 9/2000 | Choi | 455/155 |
| 6,326,889 B1 | 12/2001 | Van Horn et al. | 340/572.1 |
| 6,452,496 B1 | 9/2002 | Van Horn et al. | 340/572.1 |
| 6,545,605 B2 | 4/2003 | Van Horn et al. | 340/572.1 |
| 6,577,238 B1 | 6/2003 | Whitesmith et al. | 340/572.1 |
| 6,600,418 B2 | 7/2003 | Sainati et al. | 340/572.1 |
| 6,669,089 B2 | 12/2003 | Cybulski et al. | 235/385 |
| 6,707,376 B1 | 3/2004 | Patterson et al. | 340/10.3 |
| 7,030,761 B2 * | 4/2006 | Bridgelall et al. | 340/572.2 |
| 7,119,738 B2 * | 10/2006 | Bridgelall et al. | 342/129 |
| 7,205,931 B2 * | 4/2007 | Gila et al. | 342/127 |
| 7,215,976 B2 * | 5/2007 | Brideglall | 340/572.1 |
| 2004/0022227 A1 | 2/2004 | Lynch et al. | 370/338 |
| 2004/0036575 A1 | 2/2004 | Patterson et al. | 340/10.3 |
| 2005/0237953 A1 * | 10/2005 | Carrender et al. | 340/10.1 |
| 2005/0285742 A1 | 12/2005 | Charych et al. | 340/572.1 |
| 2006/0044147 A1 * | 3/2006 | Knox et al. | 340/572.1 |
| 2006/0107307 A1 * | 5/2006 | Knox et al. | 380/270 |
| 2006/0187050 A1 | 8/2006 | Wagner | 340/572.7 |
| 2007/0171074 A1 * | 7/2007 | Camp et al. | 340/572.7 |
| 2007/0290802 A1 * | 12/2007 | Batra et al. | 340/10.1 |

* cited by examiner

*Primary Examiner*—John A Tweel, Jr.
(74) *Attorney, Agent, or Firm*—Matthew D. Thayne; Stoel Rives LLP (57) ABSTRACT

Disclosed are embodiments of methods, systems, and apparatus for ranging or determining a distance between a reader and a wireless tag. In one embodiment, a query signal is transmitted from the reader to the wireless tag. The carrier signal from the reader may then be modulated and the modulated signal transmitted from the reader during at least a portion of a response period for the wireless tag. A modulated backscatter response from the wireless tag is received at the reader and is used to calculate a distance between the reader and the wireless tag.

44 Claims, 8 Drawing Sheets

1/2 TAG MODULATION PERIOD

Fig. 11

WIRELESS TAG RANGING

RELATED APPLICATION DATA

This application claims the benefit under 35 U.S.C. § 119(e) of U.S. Provisional Patent Application Ser. No. 60/853,319, titled "Method and System with Functionality for Finding Range Between an Electronic Tag Reader and Tag" and filed on Jun. 16, 2005, hereby incorporated by reference. This application also claims the benefit under 35 U.S.C. § 119(e) of U.S. Provisional Patent Application No. 60/775,969, filed Jun. 14, 2005, and titled "Apparatus and Method of Determining Distance Between an Electronic Tag Reader and a Tag," also hereby incorporated by reference.

BACKGROUND

The field of the disclosure relates generally but not exclusively to wireless tag readers, such as Radio Frequency Identification (RFID) tag readers, and, more particularly, to methods and apparatus for ranging a wireless tag relative to a tag reader.

Wireless transponders or tags, such as RFID tags, are used in combination with RFID interrogators to identify an object or objects. Typically, when these tags are excited, they produce or reflect a magnetic or electric field at some frequency, which may be modulated with an identifying code or other useful information.

RFID tags may either be active or passive. Active tags have a self-contained power supply. Passive tags require external excitation in order to be read within the read volume of an interrogator or reader. In passive tag systems, the interrogator or reader typically contains a transmitting antenna for sending an exciting frequency signal to the passive tag. The transmitting antenna is often positioned adjacent to an antenna for receiving a modulated signal (magnetic or electromagnetic) produced by the excited tag. This modulated signal may identify the tag and, consequently, the object associated with the tag.

Current implementations of RFID readers return only the digital data associated with the tag, rather than information regarding the distance to the tag. The present inventors have therefore recognized a need for systems and methods for effectively determining a measured distance between an RFID reader and an RFID tag when interrogated by the RFID reader.

DETAILED DESCRIPTION OF THE PREFERRED EMBODIMENTS

In the following description, numerous specific details are provided for a thorough understanding of specific preferred embodiments. However, those skilled in the art will recognize that embodiments can be practiced without one or more of the specific details, or with other methods, components, materials, etc.

In some cases, well-known structures, materials, or operations are not shown or described in detail in order to avoid obscuring aspects of the preferred embodiments. Furthermore, the described features, structures, or characteristics may be combined in any suitable manner in one or more embodiments. For example, while the preferred embodiments are described below with reference to an RFID tag, a practitioner in the art will recognize that the principles described herein are viable to other wireless tags, as well as other applications.

Figure 1:
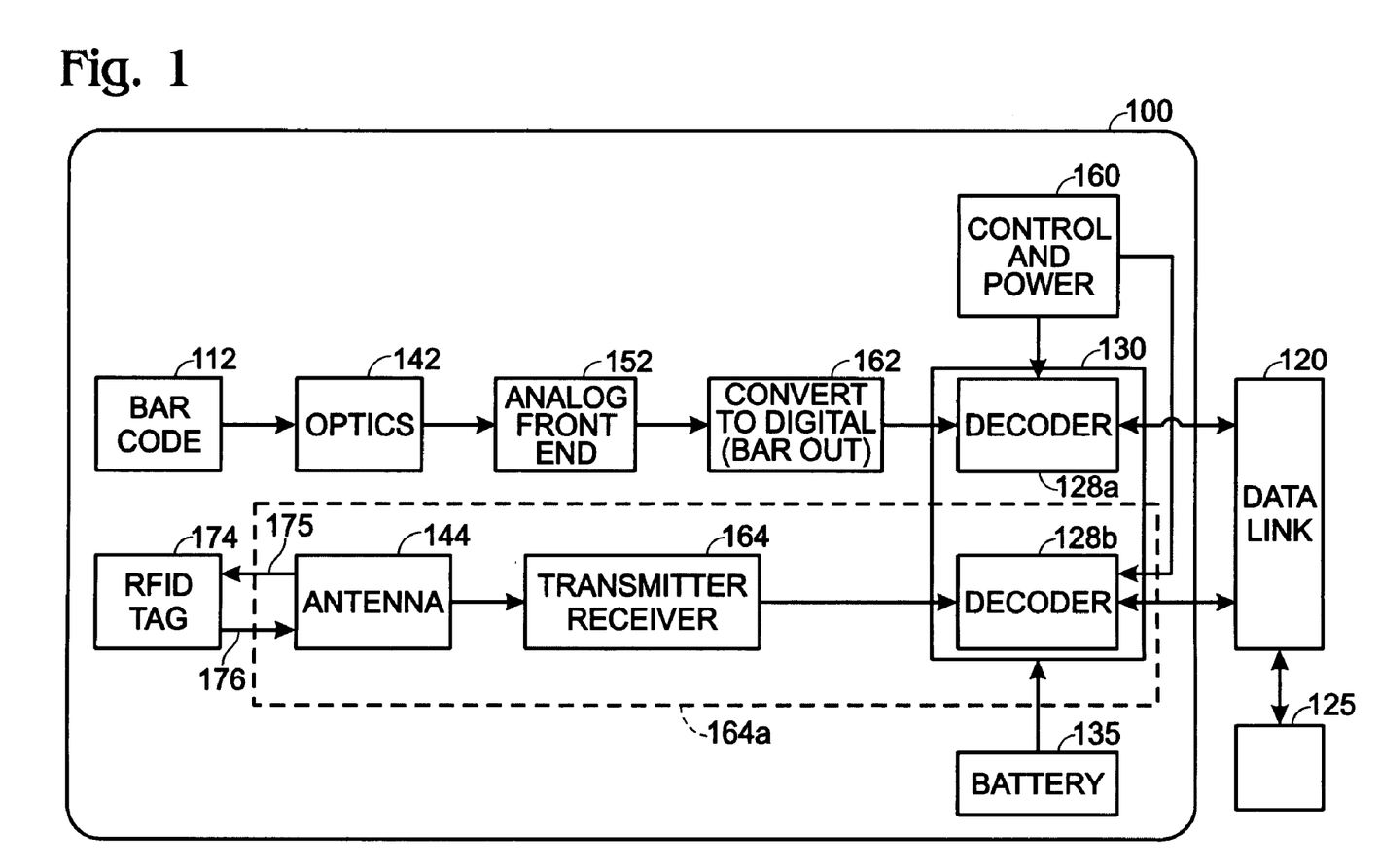
FIG. 1 is a block diagram of an embodiment of an RFID tag reader.

Disclosed herein are embodiments of methods, systems, and apparatus for tag ranging, or determining a distance between a tag and a tag reader. FIG. 1 depicts an illustrative embodiment of a multiple-technology data reader 100 including optics 142 and analog front end 152 components for reading a bar code 112. The signal generated by the analog front end 152 may be converted to a digital signal by an A/D converter 162, which is connected to a device microcontroller 130. Typically, the interrogator 164a is powered by a battery 135. The reader 100 further includes an antenna 144. The antenna 144 may be used to transmit a modulated RF signal or carrier signal 175 to an RFID tag 174. The RFID tag 174 may then reflect a backscatter signal 176 back to the antenna 144. The RFID tag 174 may include a circuit that results in a backscattering via a fixed data pattern. Such backscattering may occur when the fixed data pattern is returned in response to a (first) read command from the interrogator 164a. In addition, the RF signal or carrier signal transmitted by the RFID reader 100 may be modulated during the RFID tag's response 176 in order to resolve distances greater than the wavelength of the UHF carrier band.

The transmitter/receiver 164 component of RFID interrogator 164a sends and receives, respectively, the RF signal 175 and backscatter signal 176. The transmitter/receiver 164 of interrogator 164a may be connected to the device microcontroller 130. The microcontroller 130 includes a decoder and control interface 128a for the bar code reader and another decoder and control interface 128b for the RFID interrogator 164a, although decoders 128a and 128b need not be separate. The decoder and control interfaces 128a and 128b may be connected to a device communications control and power unit 160. The microcontroller 130 may be connected to a host computer 125 via USB link 120, or other interfaces known or available to one of ordinary skill in the art. Examples of multiple-technology readers and other background material that may be used in connection with, or relevant to, the present disclosure, may be found in U.S. Pat. No. 6,415,978 titled "Multiple Technology Data Reader For Bar Code Labels And RFID Tags," which is hereby incorporated by reference.

The tag 174 may be selected through singulation so that the tag's particular response 176 may be known. That is, the singulation process may allow the identification of the tag's modulation pattern, backscattered maximum, and/or minimum value. The background signal may be measured during the backscatter minimum of the modulation pattern of the tag's response 176. The backscatter of the modulated carrier signal from the tag may be identified during the backscatter maxima of the modulation pattern of the tag's response 176. In addition, the software of multi-technology reader 100 may contain an algorithm for transmitting an excitation signal from a reader to the wireless tag, modulating the excitation signal at the reader, transmitting a modulated excitation signal from the reader to the wireless tag, detecting the modulated excitation signal in a backscatter response from the electronic tag at the reader, measuring a delay between the modulation of the transmitted excitation signal and the backscattered reflection of the modulated excitation signal from the wireless tag, and/or calculating the distance between the wireless tag and the reader using the delay. The delay used to calculate the distance between the wireless tag and the reader may consist of, for example, a phase shift between the query signal and the modulated query signal or a time delay between sending the query signal and receiving the modulated query signal.

Figure 2:
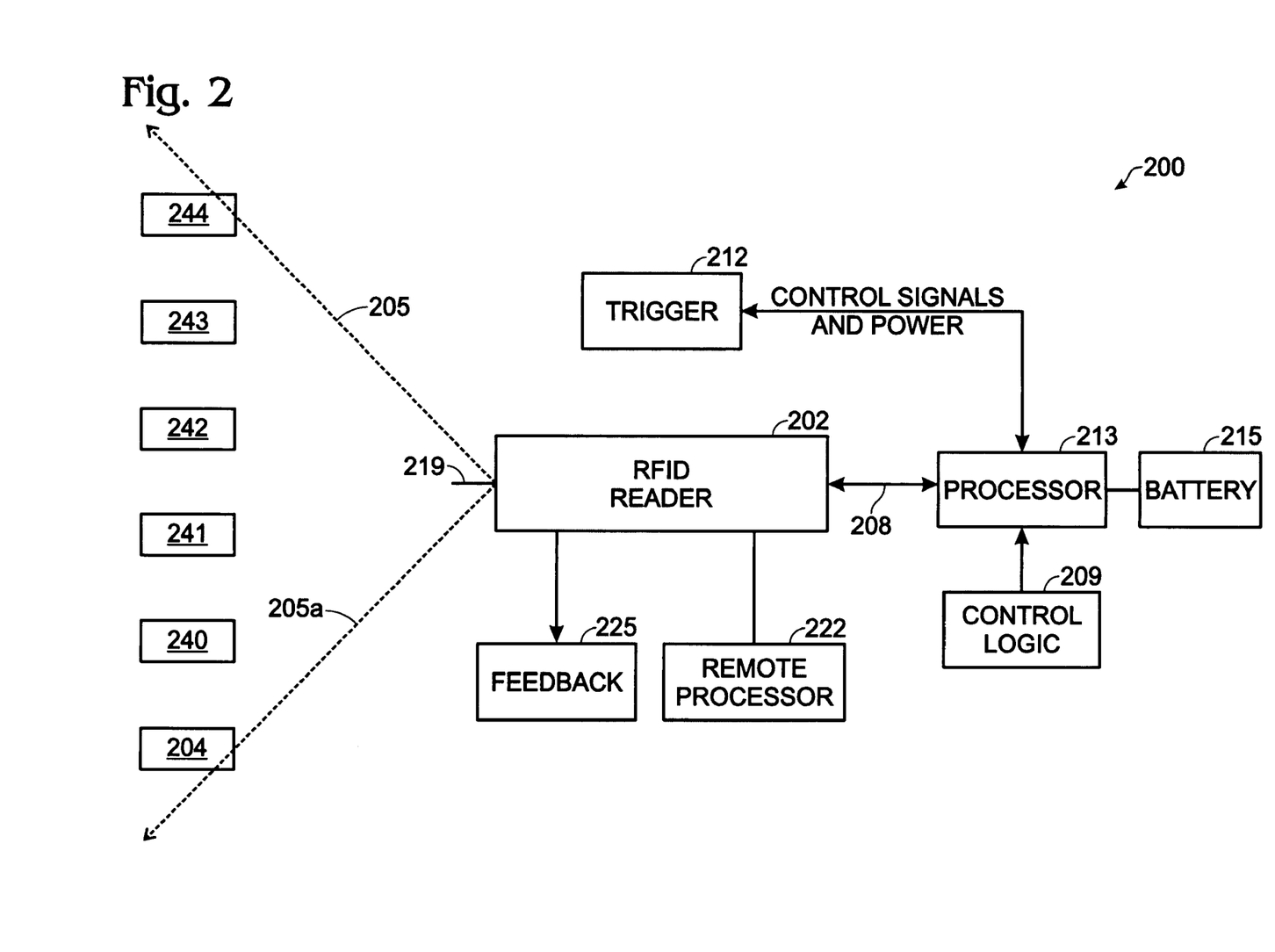
FIG. 2 is a block diagram of an embodiment of an RFID tag reader and a plurality of wireless tags.

FIG. 2 illustrates a block diagram of an RFID apparatus 200 according to a preferred embodiment. The apparatus may use an RFID reader 202 to interrogate for a particular RFID tag(s) in a plurality of RFID tags, including, but not limited to, tags 204, 240, 241, 242, 243, and 244. The RFID apparatus may comprise a fixed RFID reader 202, such that the RFID tags 204, 240, 241, 242, 243, and 244 are passed in front of the reader, which may be employed in contexts such as providing tags that are attached to items on a conveyor belt. One example of a fixed reader can be found in U.S. Pat. No. 5,864,129 titled "Bar Code Digitizer Including Voltage Comparator," which is incorporated herein by reference. One or more embodiments disclosed herein may be implemented into, or used in connection with one or more aspects of, the reader(s) disclosed in that patent. Alternatively, the RFID reader 202 may comprise a hand-held reader, wherein RFID reader 202 is passed over the RFID tags 204, 240, 241, 242, 243, and 244. Furthermore, reader 202 may include software similar to that discussed above.

The RFID reader 202 may also include a feedback component 225. One such component may comprise a progress bar on, for example, an LCD display, with the progress bar configured to increase as the distance between the interrogator and tag decreases, or vice versa. This display provides feedback that allows the user to judge whether or not the tag is near, and may also be used to singulate the closest tag to the reader and/or to locate a particular tag. Alternatively, or additionally, the feedback component 225 may comprise auditory feedback. In one embodiment, an audible signal may be generated when an RFID tag is read. The audible signal may change in pitch as the distance to the tag varies. The auditory feedback may also include a sequence of tone-beeps that increase or decrease in frequency in response to detecting an increasing distance between the reader and the tag.

The RFID reader 202 may be connected via a USB link 208 or other interface(s) to processor 213. The interface link may be hardwired to an infrared modem connection, an RF modem connection, a combination of connections, or other suitable connections. A battery 215 may be coupled with the processor 213.

RFID reader 202 may include a self-contained micro-processor and memory capable of storing data, and may also interface with a remote processor 222. Processor 213 may receive control input from a control logic circuit 209 for communication with RFID reader 202. The control logic 209 may be programmable and part of processor 213 or may be separate. An activation switch, such as trigger 212, may be used to provide control signals to processor 213. The transmitting power may provide a desired sensing volume between 205 and 205a using antenna 219, wherein a particular tag may be identified from among the tags 204, 240, 241, 242, 243, and 244.

Figure 3:
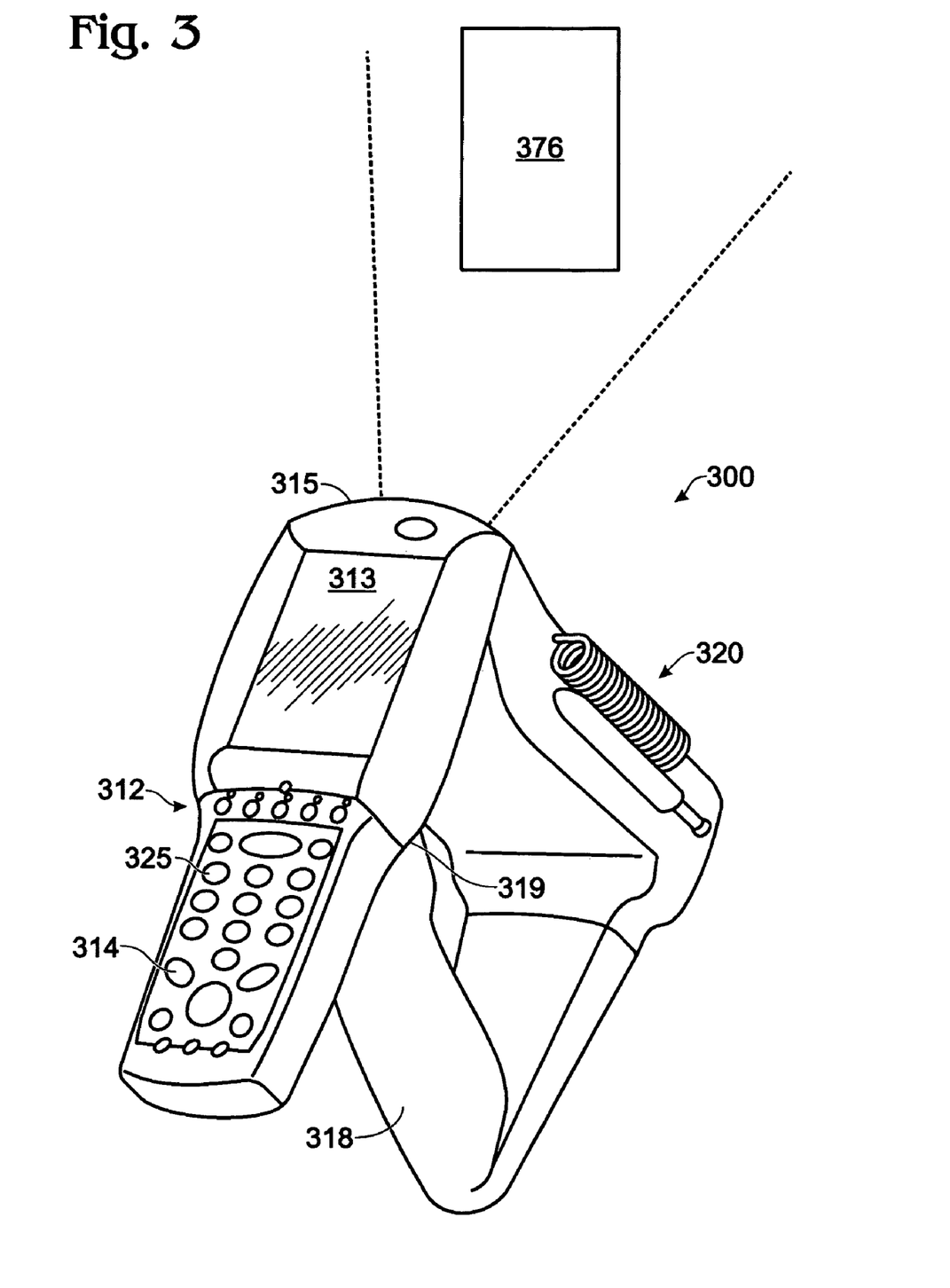
FIG. 3 is a perspective view of an embodiment of an RFID tag reader and a diagrammatic view of a wireless tag.

FIG. 3 illustrates a handheld combination reader 300 comprising a portable terminal section 312, a handle section 318, and an RFID interrogator section 320. The portable terminal section 312 may include a touch screen display 313 and a keypad section 314 for providing control or data input into the terminal and/or visual display. In addition, the terminal 312 may include a front window 315 through which a data reading device, such as an imager, may be provided to read optical codes. The reader 300 may comprise a combination system with one or more of the various functions controlled by the terminal 312. Data may be entered into the reader 300 by using, for example, the touch display screen 313 or keypad 314. Within a particular mode of operation, the user may activate a particular read operation by, for example, actuating the trigger 319 or a scan key button 325. The trigger 319 may be located on the front of the handle 318. The scan key button 325 may be located on the keyboard 314. In addition, other virtual switches may be used on the touch screen display 313 to activate a read operation.

In order for the RFID reader 300 to find the range or location of an RFID tag 376, it may be helpful for the response of the tag 376 to be known or predicted. A read command from the reader may be issued so that the particular tag 376 of interest alone will respond with its known or predicted response. A modulated signal may then be transmitted during the response period with respect to the read command. As examples of preferred modulations, the amplitude, phase, and/or frequency of the transmitted signal may be modulated. It some embodiments, this modulation may be implemented as a change from a single step to a continuous sinusoidal waveform modulation. As another option, the modulation may be such that the modulated signal has a fraction of the power of the unmodulated signal. In some particular embodiments, the modulation may be about 30% or less of the unmodulated signal.

A delay may be measured between the modulated signal and the corresponding backscattered response from a wireless tag. This delay may comprise, for example, a phase shift and/or a time delay between the signals. To achieve higher accuracy, some embodiments may utilize a delay, as described above, to estimate the range of a tag to within one wavelength of a high frequency signal (or the carrier frequency). The ranging steps may then be repeated at the higher modulation frequency.

With reference again to the particular embodiment depicted in FIG. 3, during a read operation in response to a trigger 319 pull, the reader 300 may be configured to send out an interrogation signal. Upon receipt of the interrogation signal, an RFID tag 376 may respond by modulating a backscatter signal containing the tag data information. The RFID reader 300 may then sense the modulated backscatter signal and process the signal to obtain the data. The range or location of the tag may then be calculated by the reader. Alternatively, replies to subsequent commands may then be used to calculate the range. The range may then be displayed on the touch screen 313. Alternatively, or additionally, other feedback may be provided to the user. In some embodiments, such feedback may comprise auditory and/or other visual feedback, such as a progress bar, as described previously.

The background reflected signals may be measured during the backscatter minimums of the known or predicted response from tag 376. The modulated carrier signal may be identified and read during the backscatter maxima of the known or predicted response from tag 376. In addition, reader 300 may also use software having one or more algorithms for performing any of the above-mentioned steps.

It may be preferred to distinguish or separate the backscattered signal of the tag of interest from all other backscattered signals in the environment. The tag of interest may be distinguished from other tags by modulating its radar cross-section or backscatter in the manner as specified in an air interface protocol (AIP). The tag will minimize and maximize its radar cross-section by absorbing or reflecting, respectively, incident radio frequency (RF) energy from the interrogator. The phase or time may be first recorded during the absence of a backscattered signal from the tag, which is during the backscatter minimum. The phase or time is then recorded again during the presence of the backscattered signal such that it is synchronous with the backscatter maximum. The backscatter from the background, measured during the tag's backscatter minimum, can be subtracted or eliminated from the signal received during the tag's backscatter maximum, so that the reflection from the tag alone is known. The time delay or phase shift may then be measured by calculating the time interval or phase shift between zero-crossings of the original and backscattered signals from the tag.

The tag of interest may be queried or searched for in a location having many tags, such as a warehouse. In one embodiment, there may be an array of data readers fixed at points or locations in the warehouse. Such readers may be used for a variety of applications including, but not limited to, asset tracking of inventory or conveyor routing of packages that may be switched to different destinations. Each reader may be able to transmit/receive signals within a sphere of a predefined radius. Therefore, the array of readers may be used to determine the position of a tag of interest. The tag in the field of the interrogator may be identified or singulated so that its response is known or predictable. If the tag is within the RF field of the interrogator, the tag's response may be predicted so a backscattered signal can be evaluated at the appropriate times. As the signal is received, the signal may be digitized and stored. Once the entire signal is complete, the signal may be validated and the tag distance evaluated at the appropriate periods.

The calculation of the distance may be obtained by using the following formula:

Distance=$\Delta T/(2 \times c)$ where c is the speed of light and $\Delta T$ is the time delay. Alternatively, the calculation of the distance may be obtained from the phase shift by using the following formula:

Distance=$\theta \times \lambda/(4 \times \pi)$ where $\theta$ is the phase shift angle and $\lambda$ is the wavelength of the signal, which is equal to the speed of light (c) divided by the frequency (f).

The distance from an interrogator antenna to the tag of interest may be determined by measuring a delay, such as the phase shift or time delay, between the transmitted modulated carrier signal from the reader and the reflected response from the tag when imposed with the modulated carrier signal. The transmission carrier signal from the interrogator is typically continuous and the carrier signal may not be modulated during the initial period in which the tag responds. The tag typically responds by modulating its backscatter when generating a reply to the interrogator. The maximum distance between the antenna and tag that may be determined by phase shift, without modulating the carrier frequency, is a length of about one-half of the wavelength. Consequently, to increase the range of the measurable distance between an interrogator antenna and a tag, a modulation may be imposed on the carrier signal by the interrogator during the tag's backscatter response. The modulation of the carrier signal may be a step change in amplitude, a repetitive square wave modulation, a sinusoidal modulation, or any other readily-detected or differentiated waveforms relative to the modulation superimposed by the tag.

In the environment in which RFID tags operate, there may be reflections returned to the interrogator in the background from objects other than the desired tag. The tag may distinguish itself from the background reflections by modulating the absorbed or reflected radiation in a predetermined manner through an AIP. The interrogator may modulate the amplitude, frequency, and/or phase of the carrier signal during at least a portion of the time that the tag responds. The phase or time may be first recorded during the absence of a backscattered signal from the tag, which is during the backscatter minimum. The phase or time is then recorded again during the presence of the backscattered signal, such that it is synchronous with the backscatter maximum. The time delay or phase shift may then be measured by calculating the time interval or phase shift between, for example, zero-crossings of the original and backscattered signals and ignoring or subtracting events corresponding to the background reflections. Of course, it should be apparent that, instead of zero-crossings, any other identifiable feature(s) of the modulation may be used to provide the bounds for the measurement.

Figure 4:
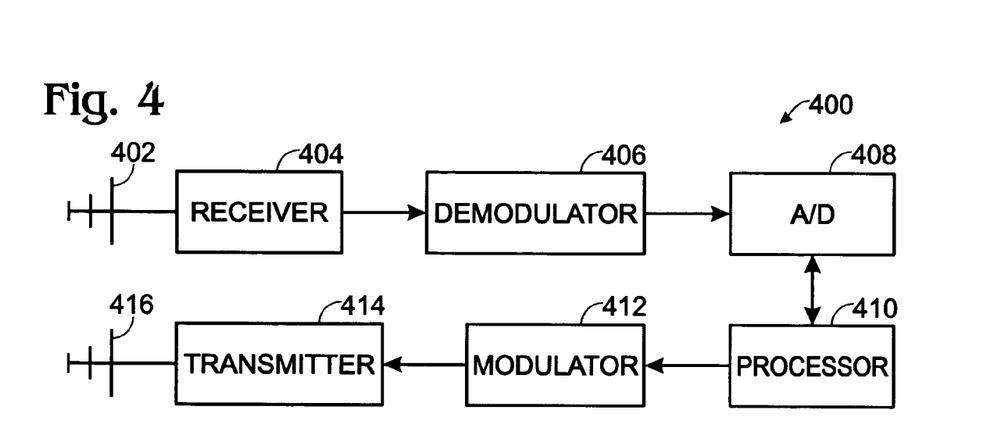
FIG. 4 is a simplified block diagram of an embodiment of an RFID tag reader for ranging passive wireless tags.
Figure 5:
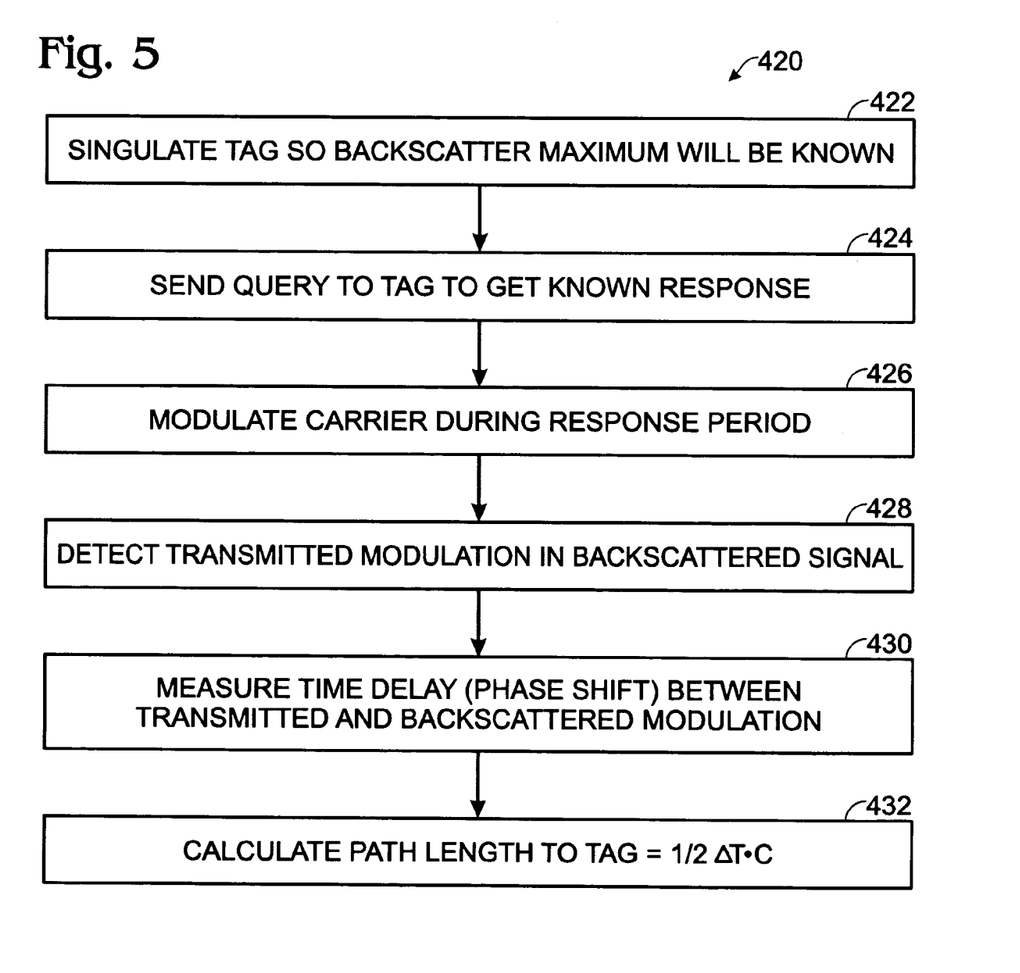
FIG. 5 is a flow chart of a method for determining the distance from an RFID tag reader to a wireless tag.

FIG. 4 illustrates a simplified system of an RFID interrogator 400 to range passive RFID tags. The interrogator 400 includes a receiving antenna 402, a receiver 404, a demodulator 406, an analog to digital converter 408, a processor 410, a modulator 412, a transmitter 414, and a transmitting antenna 416. It should, of course, be understood that many readers will have a single antenna for both transmission and receipt of signals. FIG. 5 illustrates one embodiment of a ranging method 420 that may be performed by interrogator 400. In such a method, a signal received at receiver 404 may be demodulated via demodulator 406. This demodulation may be accomplished by analog methods. Alternatively, the demodulation may be accomplished by processing a digitized signal. For example, the signal may be converted from an analog (A) to a digital (D) signal at converter 408, assuming the A/D conversion is fast enough. This may be accomplished in one embodiment by using a digital signal processor (DSP) chip.

There are several potential methods for measuring the phase angle and/or time delay using, for example, analog or digital processing. In some embodiments, the processing may include the measurement of the time interval between zero-crossings, that is, the zero point between the maximum and minimum values of a sinusoidal signal, or other identifiable modulation events in the transmitted and received signal envelopes. Alternatively, the time delay or phase angle may be measured by triggering a voltage ramp at an identifiable modulation event in the transmitted modulated carrier signal and resetting the voltage at a modulation event in the received modulated query signal corresponding to the modulation event in the transmitted modulated query signal. For example, the reader may accomplish the measurement by triggering a voltage ramp with a zero-crossing on the transmission envelope and resetting the voltage with the corresponding zero-crossing on the received envelope. The zero-crossing may, of course, be replaced by other identifiable modulation events. In some embodiments, the interrogator may send a command to start a clock or other timer in response to an identifiable modulation event on the transmitted envelope. The timer may be stopped and/or read in response to identifying a corresponding modulation event in the backscattered response signal from the tag. The distance to the tag may then be calculated by taking half of the elapsed time between the corresponding events multiplied by the speed of light.

FIG. 5 illustrates a ranging method 420 for calculating a distance between an RFID interrogator (reader) and a passive RFID tag. At step 422, the RFID reader singulates a population of RFID tags by polling to locate a certain tag and to identify its backscatter maxima. Next, at step 424, the reader sends a query to the identified RFID tag to get a known response. At step 426, the reader begins generating a modulated carrier signal during the response period. The modulated carrier signal may include, but is not limited to, sinusoidal, step, square wave or any useful signal that can be distinguished when superimposed on the carrier signal. The suitable depth and type of modulation will depend on the tag of interest, the AIP, the desired read range, and other variables. In some embodiments, modulation of the carrier signal will not exceed about 30% of the amplitude of the carrier signal.

The reader then detects the reflection of the transmitted modulation in the tag backscatter signal at step 428 and measures at step 430 the time delay or phase shift between the transmitted modulated backscatter signal and the modulated carrier signal. At step 430, the time delay or phase shift may be measured by analog or digital processing by measuring, for example, the time interval between zero crossings or by triggering a voltage ramp as described above. As also described above, a timer may be started and stopped, or read, in response to a reference modulation event and used to calculate the distance to the tag. At step 432, the path length or distance of the RFID tag from the reader is calculated using the phase shift or time delay.

The UHF wavelength of a typical carrier signal (approximately 30 cm, or one foot, at 915 MHz) is much less than the typical path length from a reader to a tag and back. Thus, there will typically be several distances at which the phase shift between the transmitted and received carrier will be the same. It may therefore be preferable to modulate the transmitted signal during the response period (frequency, phase, and/or amplitude modulation) at a wavelength greater than twice the distance to the tag to prevent ambiguity in the distance measurement. In some implementations, frequency or phase modulation may be preferred over amplitude modulation, since amplitude modulation reduces the power available to power the tag, and hence the distance at which the tag can respond.

The signal received from a tag is the sum of the backscattered signal from the tag plus the background noise, if any. The signal received from the tag will typically follow a different path from that of the background signal(s), and will typically exhibit different delays. In some implementations, the background signal may be the major portion of the received signal at the reader, but it will typically be a constant fraction of the transmitted signal. Because background can dominate the received signal, it may be necessary, or at least desirable, to subtract the background from the combined signal received by the tag. In order to accomplish background subtraction, the response of the tag should be known or predicted and one or more identifiable transitions (or other identifiable features) should occur at the tag both during its periods of maximum and minimum backscatter. One example of a way of accomplishing this is by encoding a tag such that a portion of its response is modulated at a fixed frequency. In many contexts, it may be desirable to characterize and subtract the amplitude and phase shift of the background from the signal measured during the backscatter maximum. In applications where background backscatter is minimal, this may not be necessary.

Figure 6:
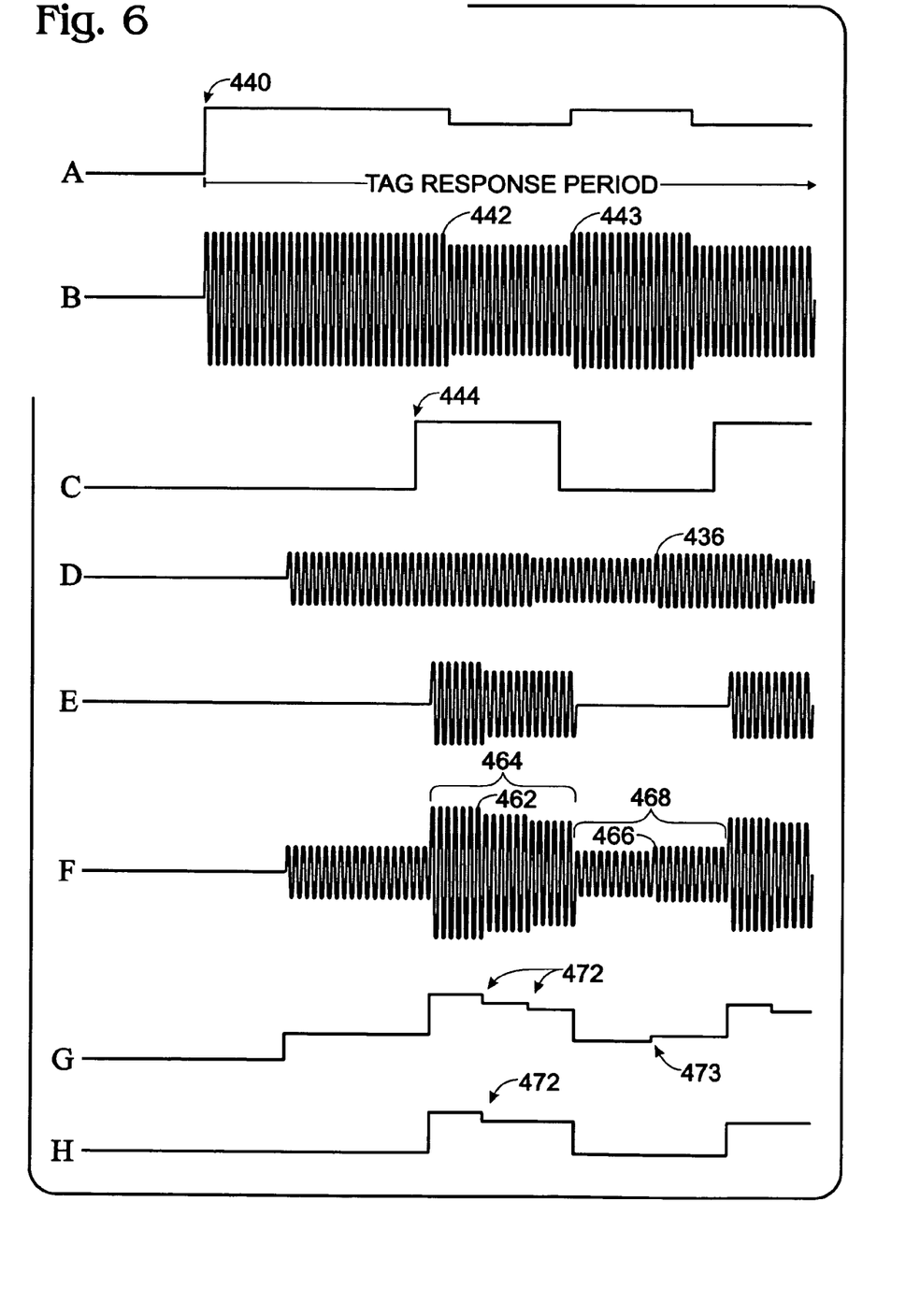
FIG. 6 presents a series of graphs of various events in a wireless tag ranging process plotted on the same timeline.

FIG. 6 illustrates a series of events plotted on the same timeline. Events A and B both correspond to the modulation envelope at a reader. Event A is the modulation envelope and event B is the carrier signal transmitted from an RFID interrogator during ranging. As seen in the figure, the query signal ends, and the tag response period begins, at 440. The carrier signal may be repetitively digitally modulated. Alternatively, other modulations may be used, such as single-step, continuous sinusoidal, ramping, or other distinguishing modulation techniques. As can be seen from the figure, there is a step 442 in the transmitted carrier signal from the interrogator, which corresponds to the start of the modulation.

With reference now to events C, D, and E in FIG. 6, the tag modulation envelope, background backscatter received at the reader, and tag backscatter received at the reader, respectively, are shown. The tag response starts at 444. The modulation pattern depicted provides a backscatter maxima/minima in a sequence based upon the AIP. The backscatter maxima of a tag is when the tag maximizes the signal it reflects. During the backscatter minima, the tag absorbs incident RF energy to power itself. It should be noted that there is no reflection of 443 in event E (nor a corresponding reflection from the tag in event F), since it impinges on the tag during a backscatter minimum.

Event F in FIG. 6 consists of the modulated backscatter signal received at the reader, along with the background signal superimposed from event D. The signal at step 462 is the reflected step in the backscattered signal from the tag corresponding to step 442 in the transmitted signal (event B). The backscattered maxima can be seen at 464 and the backscattered minima at 468. As can be seen, the backscattered minima contains a step 466 corresponding to step 436 in the background signal (event D) and 443 in B the carrier signal. Event G is the envelope of the received signal, including the background and backscattered modulated signals. Steps 472 are reflections of step 442 from event B and step 473 is a reflection of step 443 in event B.

With reference now to the envelope of event H, it can be seen that event H includes the envelope of the backscattered signal received at the reader after the background has been subtracted out of the signal. Thus, the backscattered transitions from the background indicated on event G at 473 are not shown on event H. However, step 472, corresponding to step 462 in event F, remains in the final envelope of event H.

It should be understood that, whereas the result of only one path for a background reflection has been shown in FIG. 6, there would typically be more than one "image" of each step, due to multiple reflection paths, in the background signal (and the combined signal received at the reader). However, these other potential reflection paths have not been shown so as to maintain the clarity of the figure.

As described in greater detail elsewhere, a time delay or phase shift between the transmitted modulation envelope (event A) and the backscattered modulated envelope of the received signal (event H) may be used to calculate the distance to the tag. For example, the time delay or phase angle may be measured by analog or digital processing. This processing may include measuring the time interval between zero-crossings applicable to sinusoidal modulation or other identifiable modulation events in the transmitted and received signal envelopes. Alternately, the time delay or phase angle may be measured by triggering a voltage ramp with a zero crossing on the transmission envelope, resetting the voltage and then triggering a voltage ramp with a zero crossing on the receiving envelope.

In yet another embodiment, a portion of a data field or circuit of an RFID tag may be encoded with a fixed-frequency bit pattern resulting in a particular backscatter response when the tag is interrogated. The particular backscatter response may occur when the portion of the data field of the RFID tag that is encoded with a bit pattern is interrogated in response to a first read command from the reader 100 of FIG. 1. The particular modulated backscatter response may occur when the portion of the data field of the RFID tag that is encoded with the bit pattern is interrogated in response to a second read command from the reader. Furthermore, a portion of the data field of the RFID tag may be encoded with a fixed frequency bit pattern resulting in a particular modulated backscatter response for a fixed or indefinite interval of time. The particular modulated backscattering may occur when the portion of the data field of the RFID tag that is encoded with the bit pattern is interrogated for a specific time interval in response to a third read command from the reader. In another embodiment, the fixed frequency bit pattern may be replaced with another specific data pattern. This method may allow for the time delay or phase shift to be measured by relatively simple mathematical algorithms, such as Fourier analysis.

The time interval of the read command may be selected from various different values of time. For example, the interval of time may continue until the carrier signal from the reader is turned off. Alternatively, a fixed time interval may be used. A desired time interval may assist in measuring the time delay or phase shift of the RFID tag modulated backscatter response during a period of maximum backscatter from the tag to find the range of the tag.

Depending on the read command, the reader may interrogate a tag and receive a variety of tag-predicted responses. The predicted response(s) may be used with a modulated carrier signal to determine the distance between the wireless tag and an antenna of the reader by measuring the time delay or phase shift of the predicted response and the modulated carrier signal.

The range of the interrogator antenna from the tag may be determined by encoding a portion of the tag's data field with a fixed frequency bit pattern that results in a predicted response when the tag is interrogated. In other words, the tag may be configured such that the frequency of the alternating backscatter maxima/minima of its backscatter response is at a fixed frequency. The fixed frequency may also comprise a plurality of frequencies or data patterns that are encoded onto the tag. A particular predicted response from the tag may occur when the specific encoded portion of its data field is interrogated in response to a read command. If the predicted response is a modulated backscatter during a time interval, the time interval may be selected from a variety of values that allow adequate processing time. The predicted response may be used with a transmitted modulated carrier signal, to determine the distance between the electronic tag and an antenna of the interrogator. In some embodiments, the tags may be encoded with a fixed frequency bit pattern to produce a modulation frequency at much lower frequencies than the typical carrier frequencies to which wireless tags respond. In some such embodiments, the fixed frequency may be approximately 150 kHz.

A read command may be activated automatically through a software algorithm in response to activating a trigger, such as trigger 319 of FIG. 3. In some embodiments, any of the various read commands may be encoded onto one tag in different portions of the tag. Consequently, the read command may be activated from a trigger by, for example, a single trigger click, a double trigger click, or a triple trigger click to engage the commands, such as the first, second, and/or third read commands referenced above. Finally, it might be desirable to have a software switch, such as a dialog box, on the reader's display for alternative read commands.

In some systems, the data pattern encoded into one or more of the wireless tags may cause at least a portion of the tags' backscatter responses to be modulated in a known manner for an indefinite period of time. In some such systems, the indefinite period of time may terminate upon receipt of a termination command from the reader. In other systems, the data pattern may be configured to cause the modulation of the tags' backscatter response to be for a fixed period of time, as mentioned above. In some embodiments, the desired fixed period of time may be ten milliseconds.

Providing wireless tags with data patterns, as described above, may be useful for ranging tags without the need for singulating the tags beforehand. For example, if a portion of a tag's data field is encoded with a data pattern that will cause it to return a known pattern, such as a fixed frequency backscatter modulation, for a known or predicted portion of its response, determining the range of the tag can be accomplished without singulating the tag before it is ranged. Instead, the tag may be ranged while it is singulated, or as it responds to a query signal from a reader with data. A tag may typically be ranged if a portion of its response is known or predicted, which can be accomplished by encoding a fixed data pattern in a portion of its data field. Some embodiments of data readers may include software having an algorithm for determining the range or distance between the reader and a wireless tag. Such algorithms may perform the steps of 1) sending a query signal to singulate a tag of interest; 2) detecting a predicted portion of the backscatter response corresponding to an encoded modulation; 3) measuring the phase shift or time delay; and 4) calculating the range. The range may be displayed on a screen and/or a remote terminal. Alternatively, or additionally, other distance feedback may be provided to the user in the form of auditory or other visual feedback, for example. Of course, the distance may also be used as input for a range location finding program or the like.

As discussed above, to determine the range of a wireless tag, the tag may be implemented with a fixed data pattern in at least a portion of the tag's data field. When such an implementation is carried out, a predicted response may be generated by the tag when it is interrogated by a reader. In another implementation, the tag may be configured to respond to a ranging command by generating a predicted response during a fixed or indefinite interval. In embodiments generating a predicted response during an indefinite interval, the interval may cease upon termination of the carrier signal from the interrogator.

One method of obtaining a known or predicted response from a wireless tag involves distinguishing or separating the backscattered signal of the tag of interest from all other backscattered signals in the environment, otherwise referred to as the background signal. The tag of interest may be distinguishable from the other tags by modulating its radar cross-section or backscatter in the manner specified by an air interface protocol (AIP). The tag may minimize and maximize its radar cross-section by reflecting or absorbing incident radio frequency (RF) energy from the interrogator. The phase shift or time delay will typically be measured during the presence of a backscattered signal from the tag, or during the backscatter maximum. In other words, the measurement of the phase shift or time delay will be synchronous with the backscatter maximum.

For example, the tag of interest may be searched for in a warehouse. The tag may be singulated, or identified so that its response is known or predictable. If the tag is within the RF field of the interrogator, the tag's response may be predicted so that a backscattered signal can be evaluated at the appropriate times. The phase shift or time delay is measured during the presence of the backscattered signal, or during the backscatter maximum. In one embodiment, as the signal is received, it is digitized and stored. Once the entire signal is completed and stored, the signal may be validated as the backscattered signal from the tag of interest by a microprocessor coupled with the reader. Once the microprocessor validates the signal, the tag range may be calculated. The calculation of the range may be obtained by using the formulas presented earlier.

Figure 7:
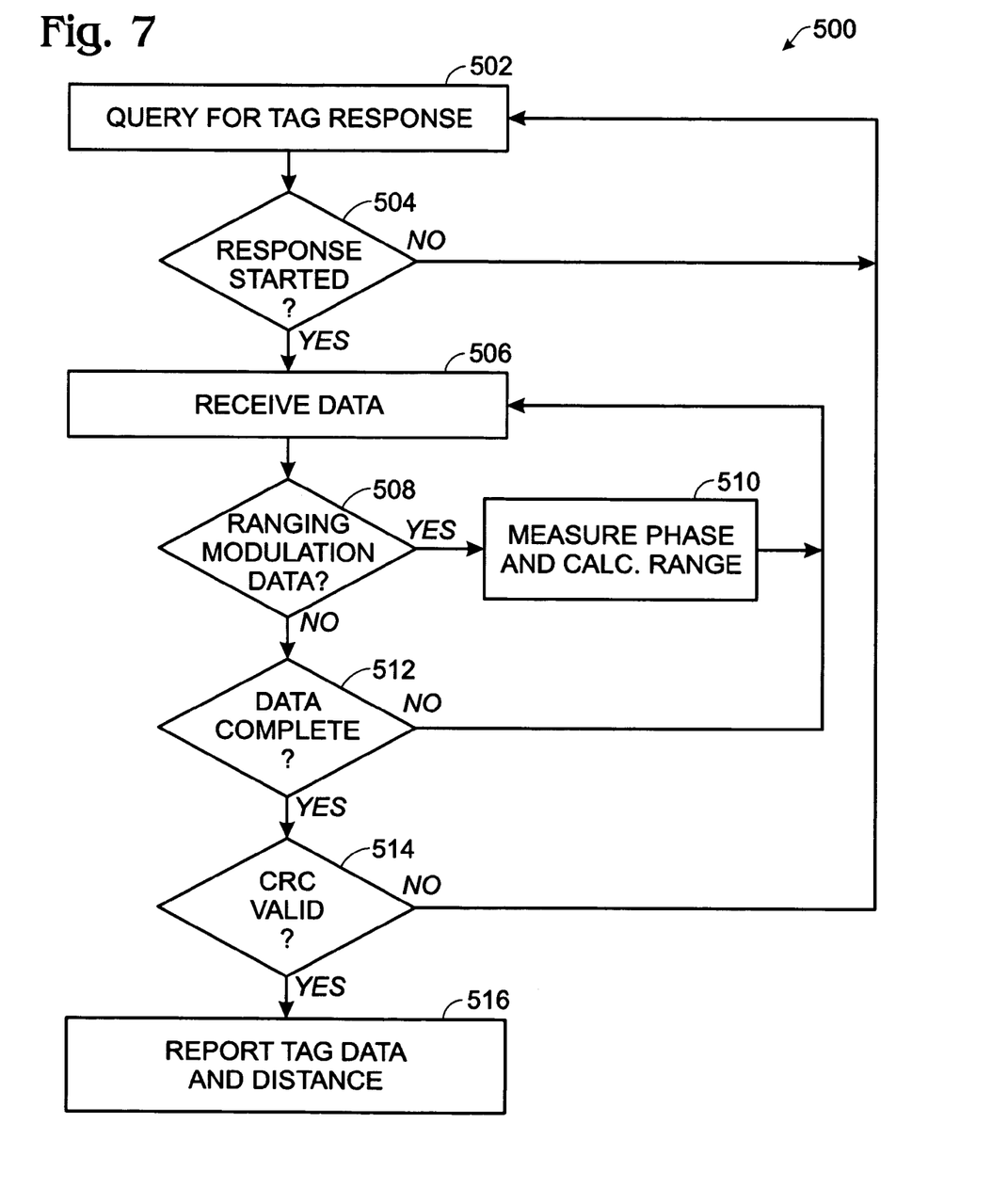
FIG. 7 is a flow chart of another method for determining the distance from an RFID tag reader to a wireless tag.

FIG. 7 depicts a flow diagram of a preferred method 500 for singulation/ranging with an encoded ranging bit pattern in an RFID tag. A user may initiate the ranging by engaging a trigger pull or other control on an RFID reader to query the RFID tag at step 502. If the tag has not responded at step 504, the RFID reader continues to query until it receives a response from an RFID tag. When the RFID reader receives a response, a storage location in the reader command-and-control circuit receives the data at step 506 and puts it into temporary storage. In connection with step 508, the encoded data from the tag results in backscattering at a fixed frequency or other known pattern. At step 510, the range of the tag from the reader is determined by measuring the time delay or phase shift between the reader's transmitted signal and the backscatter response from the tag. At step 512, if the data is not complete, then steps 506 and 508 are repeated. When the data is complete, a cyclic redundancy check algorithm (CRC) validation occurs at step 514. If the CRC is not validated, the process repeats beginning again with step 502. If the CRC is validated, then the tag data and range is reported at step 516.

If an RFID tag is configured so that a portion of its response does not vary from tag to tag, such as at a fixed frequency for example, the tag may be singulated and ranged during the same command/response sequence. Any passive RFID tag may be configured such that a portion of the tag's data is fixed. In the method illustrated in FIG. 7, after the modulated backscatter signal having encoded data bits is received from the tag, and when the corresponding location in the bit pattern of the ranging data is reached, ranging may be initiated. The ranging may be validated when the checksum or CRC (if implemented in the AIP) is received. The modulation of the interrogator signal may occur during the portion of the tag's response which is configured for ranging, which minimizes the off-peak transmitted energy spectrum.

Singulation and ranging may occur during the same command/response sequence using a passive RFID tag with an AIP that allows it to be configured with a special command. Such a command addressed to the tag of interest may cause that tag to modulate its backscatter with a pattern which does not vary from tag to tag. A second implementation of a read command may cause the tag to respond with its identification, other data, and/or a checksum or CRC (allowing the response to be checked for data integrity and data collisions) that is followed by a data pattern which does not vary from tag to tag. The predicted response may be either before or after the tag responds to its identification or other data.

The range accuracy is typically limited to a fraction of a wavelength because of signal noise and resolution. However, if the carrier frequency is modulated at a lower frequency (longer wavelength), then the phase shift determined from that greater wavelength may be used as a coarse measurement to identify the approximate length (e.g., to within one of the shorter carrier wavelengths). The frequency (and wavelength) is known very accurately. The carrier wavelength may then be used to provide increased accuracy. In some embodiments, the lower frequency may be a wavelength that is an integer multiple of the inverse fraction of the carrier wavelength. The phase shift of the carrier wavelength may then be used to resolve the distance to a greater accuracy. For example, the UHF wavelengths of the carrier frequencies used to read passive RFID tags typically vary between about 31 cm and 35 cm, with the phase shift of the carrier being ambiguous at greater ranges. However, if the carrier signal is modulated at a lower frequency, or longer wavelength (for example, 3 to 4 meters) the phase shift of which is resolvable to within about 30 cm, the range defined by the phase shift of the carrier may be accurate to within about 3 cm. Further background information for resolving distances using waves of multiple wavelengths can be found in U.S. Pat. No. 6,157,188 titled "Compact, Long-Range Absolute Position Transducer with an Extensible Compact Encoding," which is hereby incorporated by reference.

Figure 8:
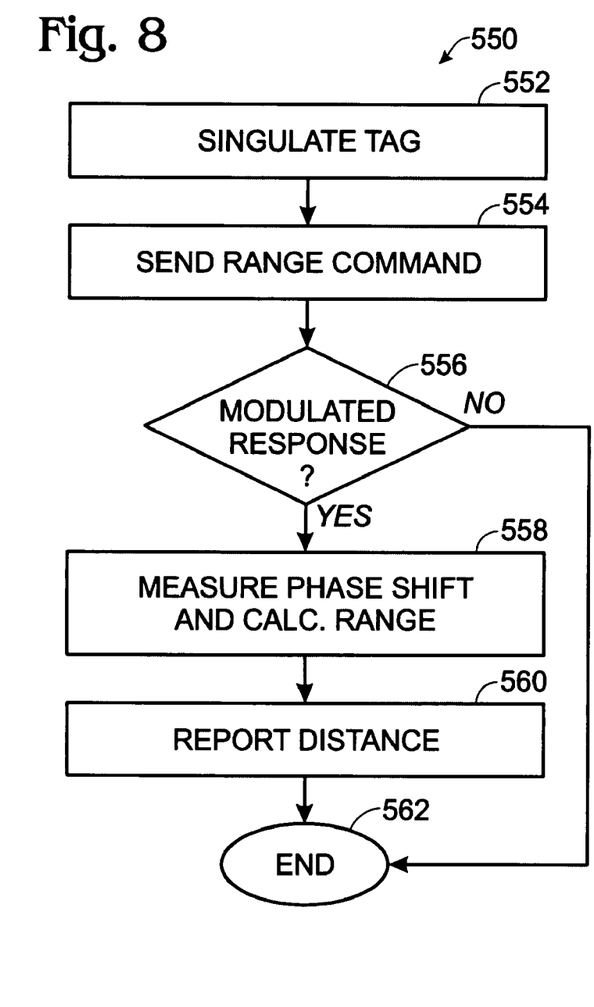
FIG. 8 is a flow chart of yet another method for determining the distance from an RFID tag reader to a wireless tag.

FIG. 8 illustrates a flow diagram of another method 550 for determining the range between an antenna of an interrogator and a wireless tag, such as an RFID tag, including: 1) at step 552 the reader singulates the tag; 2) once the desired tag of interest is located, the interrogator sends a range command at step 554; 3) the range command solicits from the tag a response to detect whether the tag is configured to provide a modulated backscatter response at step 556, but if there is no response the reading ends at step 562; 4) if there is a response, at step 558 the distance between the antenna of the interrogator and the RFID tag may be determined by measuring the time delay or phase shift between the interrogator's transmitted modulated carrier signal and the modulated backscatter response from the tag; 5) at step 558 the distance between the antenna and the tag may also be calculated using the phase shift or time delay; and 6) when step 558 is completed, the distance is reported at step 560 and the sequence ends at step 562.

The method 550 may be used if the tag responds to a command with a fixed frequency to avoid data collision. The tag is singulated so the command may be addressed to the singulated tag. Singulation may be skipped if a specific tag is being searched for. Alternatively, singulation may be accomplished using a ranging command in a search tree or other sequence that allows data collisions to be detected, for example, returning the tag identification and CRC preceding the modulated response.

Figure 9:
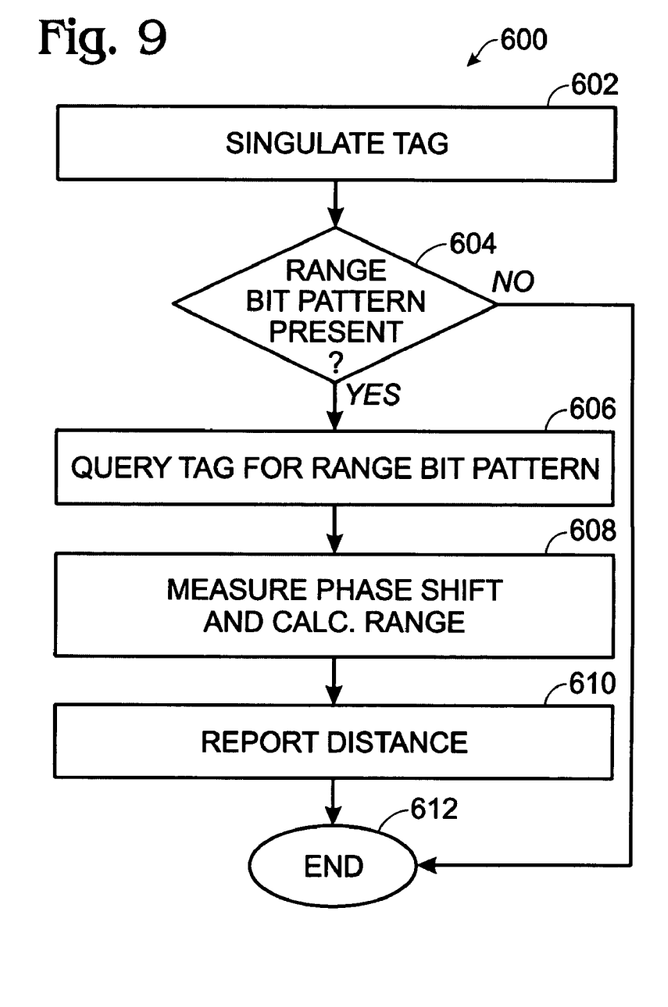
FIG. 9 is a flow chart of a method for determining the distance from an RFID tag reader to a wireless tag having a specific data pattern encoded therein.

FIG. 9 illustrates a flow diagram of another method 600 for determining the range between an antenna of an interrogator and a wireless tag, such as an RFID tag, including: 1) at step 602, the interrogator singulates and identifies a particular RFID tag of interest; 2) at step 604, the interrogator identifies if any range bit pattern is present in the RFID tag; if not, the reading ends at step 612; 3) if a range bit pattern is present, at step 606 the interrogator initiates a query to the RFID tag of interest calling for the bit pattern, so as to result in a modulated backscatter response at a fixed pattern or frequency from the RFID tag; 4) at step 608, the range between the interrogator and the RFID tag may be determined by measuring a time delay or phase shift between the transmitted modulated carrier signal from the interrogator and the modulated backscatter response from the tag; and 5) at step 610, the distance is reported and the reading ends at step 612.

Figure 10:
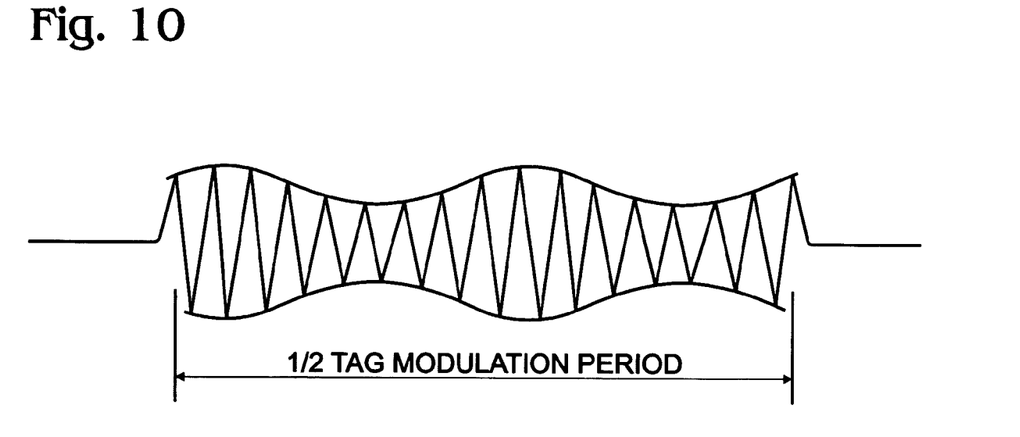
FIG. 10 illustrates a modulated backscattered signal from an RFID tag during a portion of a modulation period.

FIG. 10 illustrates a digital modulation of a backscattered signal by an RFID tag superimposed on a sinusoidal modulation from the interrogator. It should be understood that, whereas amplitude modulation is shown in the figure for simplicity of illustration and clarity, phase and/or frequency modulation of the carrier may also be used, and may be preferable for some applications. The digital modulation of the backscatter may be from an RFID tag of interest during a portion of the modulation period generated by the encoded bit pattern in the tag. The modulation period may be used in determining the time delay or phase shift between the interrogator modulation and backscattered modulation. The tag modulation period in FIG. 10 is illustrated as having a backscatter maximum for half of its modulation period (shown) and a backscatter minimum for half of its modulation period (not shown), as a portion of its modulated response at a fixed frequency. Only half of the modulation period (the backscatter maximum half) is shown in the figure, as indicated.

Figure 11:
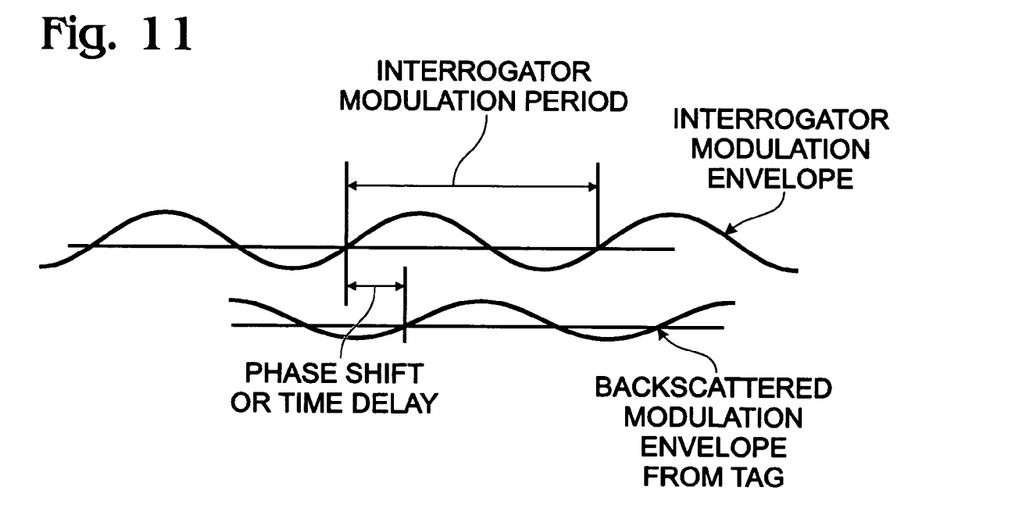
FIG. 11 illustrates a modulated carrier signal from an interrogator and a phase-shifted, modulated backscattered response from an RFID tag.

FIG. 11 illustrates a modulated backscattered signal with a phase shift during a portion of a read period, whereby the distance between the RFID reader and an RFID tag may be determined. As can be seen in the figure, the interrogator modulation envelope is compared with the backscattered modulation envelope and the phase shift between the two envelopes is measured, which may then be used to calculate the distance from the reader to the tag, as described in detail above.

The algorithms for operating the methods and systems illustrated and described herein can exist in a variety of forms both active and inactive. For example, they can exist as one or more software or firmware programs comprised of program instructions in source code, object code, executable code or other formats. Any of the above can be embodied on a computer-readable medium, which include storage devices and signals, in compressed or uncompressed form. Exemplary computer-readable storage devices include conventional computer system RAM (random access memory), ROM (read only memory), EPROM (erasable, programmable ROM), EEPROM (electrically erasable, programmable ROM), flash memory and magnetic or optical disks or tapes. Exemplary computer-readable signals, whether modulated using a carrier or not, are signals that a computer system hosting or running a computer program can be configured to access, including signals downloaded through the Internet or other networks. Concrete examples of the foregoing include distribution of software on a CD ROM or via Internet download. In a sense, the Internet itself, as an abstract entity, is a computer-readable medium. The same is true of computer networks in general.

The terms and descriptions used herein are set forth by way of illustration only and are not meant as limitations. Those skilled in the art will recognize that numerous variations and modifications can be made to the details of the above-described embodiments without departing from the underlying principles of the invention. The scope of the invention should therefore be determined only by the following claims—and their equivalents—in which all terms are to be understood in their broadest reasonable sense unless otherwise indicated.

The invention claimed is:

1. A method of determining a distance between a reader and a wireless tag, the method comprising the steps of:
    transmitting a query signal from the reader to the wireless tag;
    transmitting a modulated signal from the reader during at least a portion of a response period for the wireless tag, wherein the response period begins following transmission of the query signal;
    receiving a modulated backscatter response from the wireless tag at the reader; and
    using the modulated backscatter response to calculate a distance between the reader and the wireless tag.

2. The method of claim 1, wherein the step of transmitting a modulated signal comprises transmitting a modulated signal from the reader during at least a portion of the time during which the wireless tag responds to the signal with a backscatter maximum.

3. The method of claim 1, further comprising subtracting a background signal from the modulated backscatter response.

4. The method of claim 1, wherein the step of transmitting a modulated signal comprises at least one of modulating the amplitude, frequency, or phase of a carrier signal from the reader.

5. The method of claim 4, wherein the step of transmitting a modulated signal comprises modulating the frequency of the carrier signal to a lower frequency.

6. The method of claim 5, wherein both the modulated signal and the carrier signal are used to calculate the distance.

7. The method of claim 1, wherein the step of using the modulated backscatter response to calculate a distance comprises calculating the distance by using a phase shift between the modulated signal at the reader and a reflected response from the wireless tag corresponding to the modulated signal.

8. The method of claim 1, wherein the step of using the modulated backscatter response to calculate a distance comprises calculating the distance by using a time delay between the modulated signal at the reader and a reflected response from the wireless tag corresponding to the modulated signal.

9. The method of claim 1, further comprising:
    singulating the wireless tag before transmitting the query signal.

10. The method of claim 1, wherein at least a portion of the modulated backscatter response comprises a known pattern.

11. The method of claim 10, wherein at least a portion of the known pattern comprises a fixed frequency modulation.

12. The method of claim 11, wherein the wireless tag comprises a data pattern encoded to result in a backscattering modulation at the fixed frequency.

13. The method of claim 1, wherein the wireless tag comprises a data pattern encoded to modulate the wireless tag's backscatter response.

14. The method of claim 13, wherein the data pattern causes at least a portion of the modulated backscatter response to be modulated at a fixed frequency for a fixed interval.

15. The method of claim 13, wherein the data pattern causes at least a portion of the modulated backscatter response to be modulated in a known manner for an indefinite period of time, the indefinite period of time terminating upon receipt of a termination command from the reader.

16. The method of claim 15, wherein at least a portion of the modulated backscatter response comprises a fixed frequency modulation.

17. A method of determining a distance between a reader and an electronic tag, the method comprising the steps of:
    singulating a wireless tag;
    transmitting a query signal from a reader to the wireless tag;
    modulating a signal at the reader;

transmitting a modulated signal from the reader to the wireless tag during at least a portion of the time during which the wireless tag responds to the query signal;

detecting the modulated signal in a backscatter response from the wireless tag at the reader;

measuring a delay between the transmitted modulated signal and the backscatter response; and calculating the distance between the wireless tag and the reader using the delay.

18. The method of claim 17, further comprising subtracting a background signal from the backscatter response.

19. The method of claim 17, wherein the step of transmitting a modulated signal comprises modulating the frequency of a carrier signal to a lower frequency.

20. The method of claim 19, wherein both the modulated signal and the carrier signal are used to calculate the distance.

21. The method of claim 17, wherein the delay comprises a phase shift.

22. The method of claim 17, wherein the step of modulating a signal comprises at least one of modulating the amplitude, frequency, or phase of the signal.

23. The method of claim 17, wherein the step of measuring a delay comprises measuring a time interval between zero crossings associated with the transmitted modulated signal and the backscatter response.

24. The method of claim 17, wherein the step of measuring a delay comprises measuring a delay between an identifiable modulation event in the transmitted modulated signal and a corresponding modulation event in the backscatter response.

25. The method of claim 24, wherein the step of measuring a delay comprises:

triggering a voltage ramp at the identifiable modulation event; and resetting the voltage at the corresponding modulation event in the backscatter response.

26. The method of claim 25, wherein the step of calculating the distance comprises using at least one of a peak or an average voltage from the voltage ramp.

27. A data reader comprising:

a radio frequency identification (RFID) interrogator;

a transmission component for transmitting a query signal to a wireless tag;

a modulation component for modulating a signal for transmission via the transmission component, wherein the data reader is configured to modulate the signal while the data reader is waiting for a response to the query signal, to transmit a modulated signal to the RFID tag, and to detect a modulated backscatter response from the RFID tag; and a ranging component for calculating a distance between the RFID tag and the data reader.

28. The data reader of claim 27, further comprising a background signal separation component for subtracting a background signal from the modulated backscatter response.

29. The data reader of claim 27, wherein the ranging component is further configured to measure a delay between the modulated signal and the modulated backscatter response and calculate the distance using the delay.

30. The data reader of claim 29, wherein the delay comprises a time delay.

31. The data reader of claim 29, wherein the delay comprises a phase shift.

32. The data reader of claim 27, wherein the data reader is further configured to singulate the RFID tag before transmitting the query signal.

33. The data reader of claim 27, wherein the ranging component comprises software.

34. The data reader of claim 27, further comprising a feedback component for providing distance feedback to a user of the data reader.

35. The data reader of claim 34, wherein the feedback component comprises a visual indicator of the distance between the data reader and the wireless tag.

36. The data reader of claim 35, wherein the visual indicator comprises a progress bar.

37. The data reader of claim 34, wherein the feedback component comprises a audible indicator of the distance between the data reader and the wireless tag.

38. The data reader of claim 37, wherein the audible indicator comprises a pitch that varies in accordance with the distance between the data reader and the wireless tag.

39. A data reader comprising:

means for transmitting a query signal to a wireless tag;

means for modulating a carrier signal;

means for detecting at least one modulation in a backscattered response signal from the wireless tag;

means for measuring a delay between the modulated carrier signal and the backscattered response signal; and means for calculating a distance between the data reader and the wireless tag from the delay.

40. The data reader of claim 39, further comprising means for identifying the wireless tag and an expected response of the wireless tag prior to transmitting the query signal.

41. The data reader of claim 39, further comprising means for providing distance feedback to a user of the data reader.

42. The data reader of claim 41, wherein the means for providing distance feedback comprises a bar that varies in accordance with the distance between the data reader and the wireless tag.

43. The data reader of claim 41, wherein the means for providing distance feedback comprises auditory feedback.

44. The data reader of claim 43, wherein the auditory feedback comprises a pitch that varies in accordance with the distance between the data reader and the wireless tag.

* * * * *